US012724706B2

(12) United States Patent
Ono

(10) Patent No.: US 12,724,706 B2
(45) Date of Patent: Sep. 1, 2026

(54) HOST DEVICE, NON-VOLATILE STORAGE DEVICE AND MEMORY SYSTEM

(71) Applicant: Panasonic Intellectual Property Management Co., Ltd., Osaka (JP)

(72) Inventor: Tadashi Ono, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 12 days.

(21) Appl. No.: 19/061,238

(22) Filed: Feb. 24, 2025

(65) Prior Publication Data

US 2025/0190343 A1 Jun. 12, 2025

Related U.S. Application Data

(63) Continuation of application No. PCT/JP2023/028998, filed on Aug. 8, 2023.

(30) Foreign Application Priority Data

Aug. 26, 2022 (JP) ................................ 2022-135011

(51) Int. Cl.
*G06F 12/00* (2006.01)
*G06F 12/02* (2006.01)

(52) U.S. Cl.
CPC ................................ *G06F 12/0246* (2013.01)

(58) Field of Classification Search
CPC ...... G06F 12/0246; G06F 12/00; G06F 12/06; G06F 13/16
See application file for complete search history.

(56) References Cited

U.S. PATENT DOCUMENTS 10,545,675 B2 * 1/2020 Lee ........................ G06F 3/0631
2011/0167208 A1 * 7/2011 So ........................ G06F 12/0246 711/E12.008
2021/0382621 A1 12/2021 Muthiah et al.

FOREIGN PATENT DOCUMENTS

CN 103905519 A * 7/2014
CN 110008059 A * 7/2019 ......... G06F 12/0246
CN 115334172 A * 11/2022 ............. H04L 69/22
JP 2007334752 A * 12/2007 ......... G06F 12/0804
(Continued)

OTHER PUBLICATIONS

International Search Report issued Sep. 26, 2023 in International (PCT) Application No. PCT/JP2023/028998.
(Continued)

*Primary Examiner* — Shawn X Gu
*Assistant Examiner* — Mohammad S Hasan
(74) *Attorney, Agent, or Firm* — Wenderoth, Lind & Ponack, L.L.P.

(57) ABSTRACT

A non-volatile storage device includes a controller that controls writing, and a memory, in which the memory is connected to a host device via a first interface and a second interface different from the first interface, and includes a first data block that is a management unit used at a time when data is written from the host device to the non-volatile storage device via the first interface, and a second data block that is a management unit used at a time when data is written to the non-volatile storage device via the second interface. The first data block has a size that is n times or 1/n times a size of the second data block, where n is a natural number.

15 Claims, 9 Drawing Sheets

(56) References Cited

FOREIGN PATENT DOCUMENTS

| | | | | | |
|---|---|---|---|---|---|
| KR | 20090047880 A | * | 5/2009 | ............. | G06F 3/064 |
| WO | 2010/146767 | | 12/2010 | | |

OTHER PUBLICATIONS

SD Card Association, "SD Specifications Part 1 Physical Layer Simplified Specification Version 8.00", Sep. 23, 2020.

NVM Express Inc., "NVM Express Base Specification, Revision 2.0b", Jan. 6, 2022.

* cited by examiner

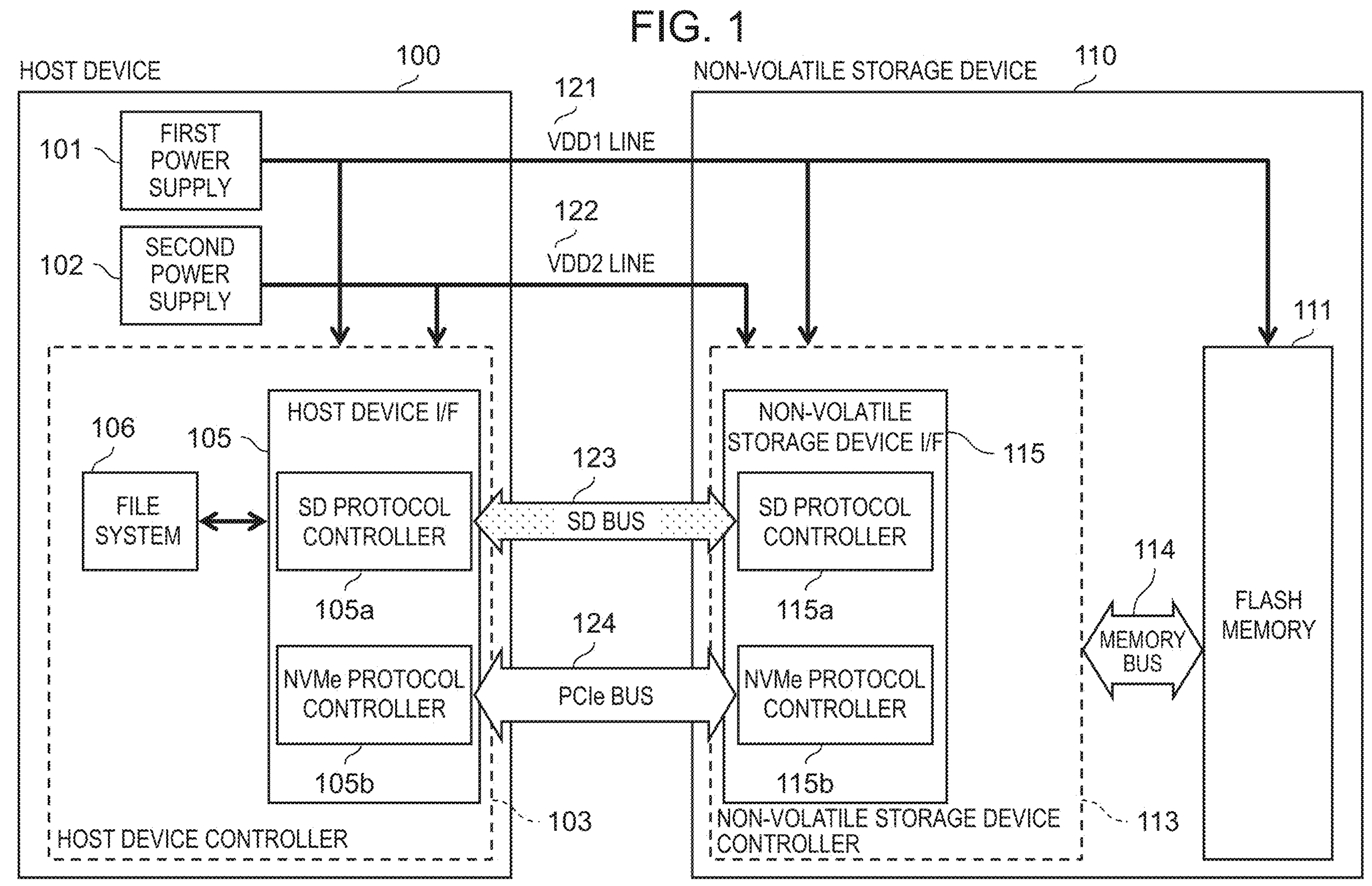
FIG. 1
HOST DEVICE
100
101
FIRST POWER SUPPLY
102
SECOND POWER SUPPLY
121
VDD1 LINE
122
VDD2 LINE
NON-VOLATILE STORAGE DEVICE
110
106
FILE SYSTEM
105
HOST DEVICE I/F
SD PROTOCOL CONTROLLER
105a
NVMe PROTOCOL CONTROLLER
105b
HOST DEVICE CONTROLLER
103
123
SD BUS
124
PCIe BUS
NON-VOLATILE STORAGE DEVICE I/F
115
SD PROTOCOL CONTROLLER
115a
NVMe PROTOCOL CONTROLLER
115b
NON-VOLATILE STORAGE DEVICE CONTROLLER
113
114
MEMORY BUS
111
FLASH MEMORY SGSU-α
SGSU-β
SGSU-γ
SGSU-δ
STREAM RECORDING DISABLED
STREAM RECORDING ENABLED
STREAM RECORDING DISABLED
STREAM RECORDING ENABLED
SGSU BITMAP
... 0 1 0 1 ...
SGSU-α
SGSU-β
SGSU-γ
SGSU-δ
= SGSU
= VALID DATA RECORDED AREA
= VALID DATA UNRECORDED AREA 201
SYSTEM AREA
202
USER AREA
AU-a
AU-b
AU-c
WRITING
ADDRESS
0x00008000
0x03008000
0x03048000
0x03068000
0x03088000
0x030C8000
SGSU-α
SGSU-β
AU BITMAP
... 1 1 1 ...
SIZE OF AU = 128 MB
SGS = 192 MB
= VALID DATA UNRECORDED AREA 201
SYSTEM AREA
AU-a
AU-b
AU-c
202
USER AREA
SIZE OF AU = 128 MB
ADDRESS
0x00008000
0x03008000
0x03048000
0x03068000
0x03088000
201
SYSTEM AREA
SGSU-α
SGSU-β
SGSU BITMAP
... 0 0 ...
SGSU-α
SGSU-β
SGS = 192 MB
= VALID DATA RECORDED AREA
= VALID DATA UNRECORDED AREA

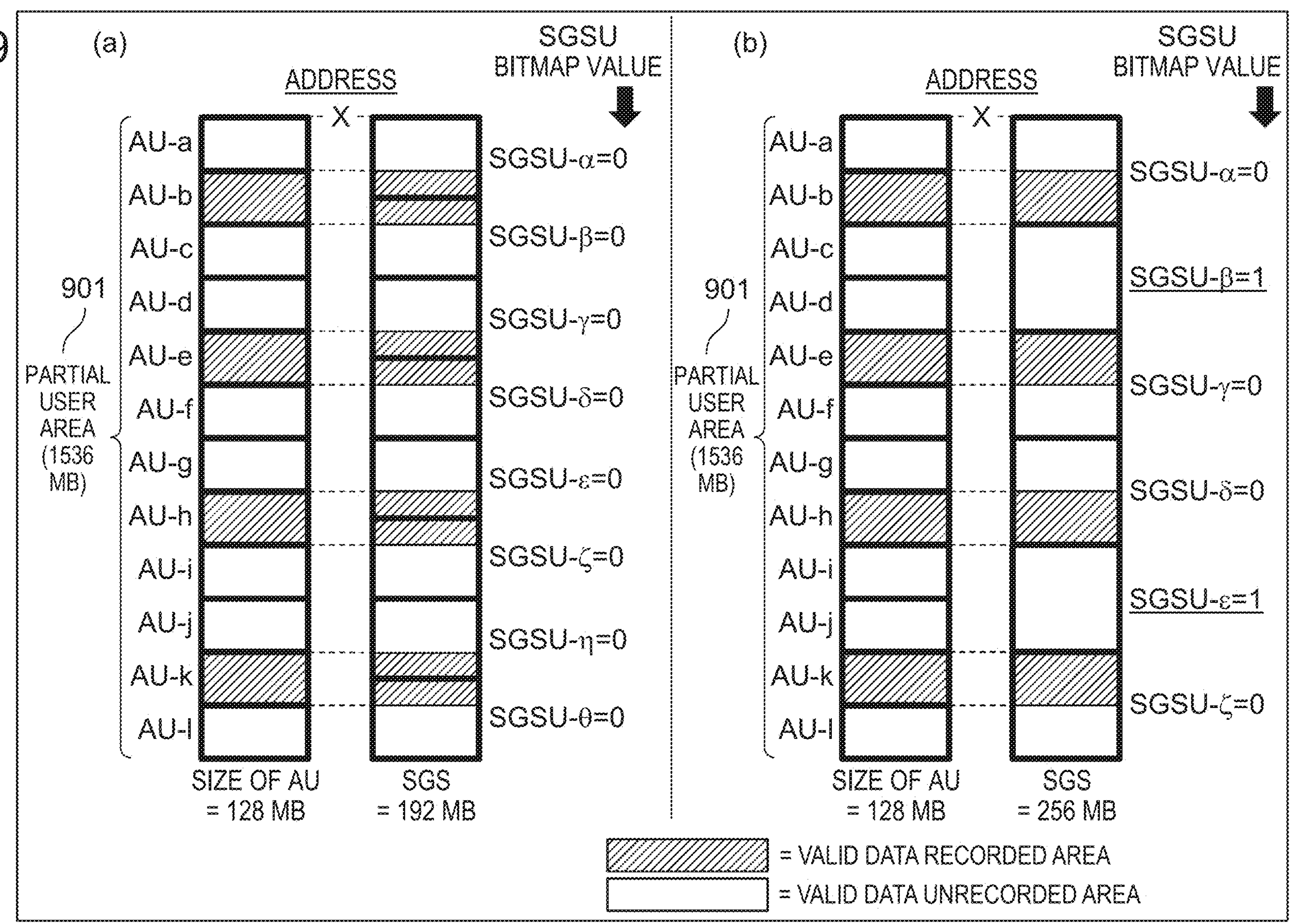
FIG. 9
(a)
ADDRESS
X
SGSU
BITMAP VALUE
AU-a
AU-b
AU-c
AU-d
AU-e
AU-f
AU-g
AU-h
AU-i
AU-j
AU-k
AU-l
SGSU-α=0
SGSU-β=0
SGSU-γ=0
SGSU-δ=0
SGSU-ε=0
SGSU-ζ=0
SGSU-η=0
SGSU-θ=0
SIZE OF AU = 128 MB
SGS = 192 MB
901
PARTIAL USER AREA (1536 MB)
(b)
ADDRESS
X
SGSU
BITMAP VALUE
AU-a
AU-b
AU-c
AU-d
AU-e
AU-f
AU-g
AU-h
AU-i
AU-j
AU-k
AU-l
SGSU-α=0
SGSU-β=1
SGSU-γ=0
SGSU-δ=0
SGSU-ε=1
SGSU-ζ=0
SIZE OF AU = 128 MB
SGS = 256 MB
901
PARTIAL USER AREA (1536 MB)
= VALID DATA RECORDED AREA
= VALID DATA UNRECORDED AREA

HOST DEVICE, NON-VOLATILE STORAGE DEVICE AND MEMORY SYSTEM

BACKGROUND

1. Technical Field

The present disclosure relates to a host device, a non-volatile storage device connected to the host device, and a memory system including the host device and the non-volatile storage device.

2. Description of the Related Art

In recent years, a non-volatile storage device has been widely used, the non-volatile storage device being mounted with an insertable and removable semiconductor memory including a flash memory or the like such as a Secure Digital (SD) card (registered trademark) as a back-end module. The SD card as a non-volatile storage device is connected to a host device such as a personal computer or a camera, and can perform data access from the host device to the flash memory being a back-end module.

Due to the characteristics of the flash memory, when data having a size smaller than that of a memory block which is a management unit of the memory is written from the host device, the writing performance deteriorates in some cases. On the other hand, stream data such as a moving image requiring real-time properties needs to be written in a flash memory with a guaranteed minimum recording speed.

Patent Literature (PTL) 1 discloses a technique of avoiding the writing performance from significantly decreasing temporarily during writing to a memory block.

In addition, recently, a non-volatile storage device accessible from the host device via a plurality of interfaces has appeared. As an example, there is an SD Express card including an SD bus mounted on an existing SD card or a microSD card, and a Peripheral Component Interconnect (PCI) Express (hereinafter abbreviated as PCIe) bus widely used as an internal bus of a personal computer or the like. While an SD protocol is defined as a protocol of flash memory access via the SD bus, Non-Volatile Memory (NVM) Express (hereinafter, abbreviated as NVMe) is defined as a flash memory access protocol via the PCIe bus.

Non-Patent Literature (NPL) 1 discloses the SD protocol, and NPL 2 discloses the NVMe protocol.

PTL 1: International Publication No. WO 2010/146767

NPL 1: SD Card Association, "SD Specifications Part 1 Physical Layer Simplified Specification Version 8.00", Sep. 23, 2020

NPL 2: NVM Express Inc., "NVM Express Base Specification, Revision 2.0b", Jan. 6, 2022

SUMMARY

The technique described in PTL 1 is based on the case of a non-volatile storage device having a single interface, and is not intended to be applied to a non-volatile storage device having a plurality of interfaces.

The present disclosure provides a host device, a non-volatile storage device, and a memory system that enable efficient writing of data at the time when stream data is recorded in a non-volatile storage device having a plurality of interfaces.

A non-volatile storage device according to the present disclosure is connected to a host device via a first interface and a second interface different from the first interface, the non-volatile storage device including: a controller that controls writing; and a memory, in which the memory includes: a first data block that is a management unit used at a time when data is written from the host device to the non-volatile storage device via the first interface; and a second data block that is a management unit used at a time when data is written to the non-volatile storage device via the second interface, and the first data block has a size that is n times or 1/n times a size of the second data block, where n is a natural number.

Furthermore, a memory system according to the present disclosure includes: a host device; and a non-volatile storage device connected to the host device via a first interface and a second interface different from the first interface, in which the non-volatile storage device includes: a controller that controls writing; and a memory, the memory includes: a first data block that is a management unit used at a time when data is written from the host device to the non-volatile storage device via the first interface; and a second data block that is a management unit used at a time when data is written to the non-volatile storage device via the second interface, the host device is configured to: at a time when data is written to the non-volatile storage device via the first interface, acquire a size of the first data block via the first interface, select the first data block including recorded valid data with a size less than or equal to a first value, and write the data; and at a time when data is written to the non-volatile storage device via the second interface, acquire a size of the second data block via the second interface, select the second data block including recorded valid data with a size less than or equal to a second value, and write the data, and the first data block has a size that is n times or 1/n times a size of the second data block, where n is a natural number.

Furthermore, a host device according to the present disclosure is connected to a non-volatile storage device via a first interface and a second interface different from the first interface, the host device includes a writing unit that, at a time when data is written to the non-volatile storage device via the first interface, acquires a size of a first data block via the first interface, selects the first data block including recorded valid data with a size less than or equal to a first value, and writes the data, and at a time when data is written to the non-volatile storage device via the second interface, acquires a size of a second data block via the second interface, selects the second data block including recorded valid data with a size less than or equal to a second value, and writes the data, the first data block is a management unit used at a time when data is written to the non-volatile storage device via the first interface, and the second data block is a management unit used at a time when data is written to the non-volatile storage device via the second interface.

According to the present disclosure, data can be efficiently written at the time when the data is recorded in the non-volatile storage device having the plurality of interfaces.

BRIEF DESCRIPTION OF THE DRAWINGS

FIG. 1 is a block diagram illustrating a configuration of a memory system including a non-volatile storage device and a host device according to the present exemplary embodiment.

FIG. 9 is a diagram comparing the states of the flash memories after the stream is recorded via the SD bus on the basis of the conventional technique and the present exemplary embodiment.

DETAILED DESCRIPTIONS

Figure 2:
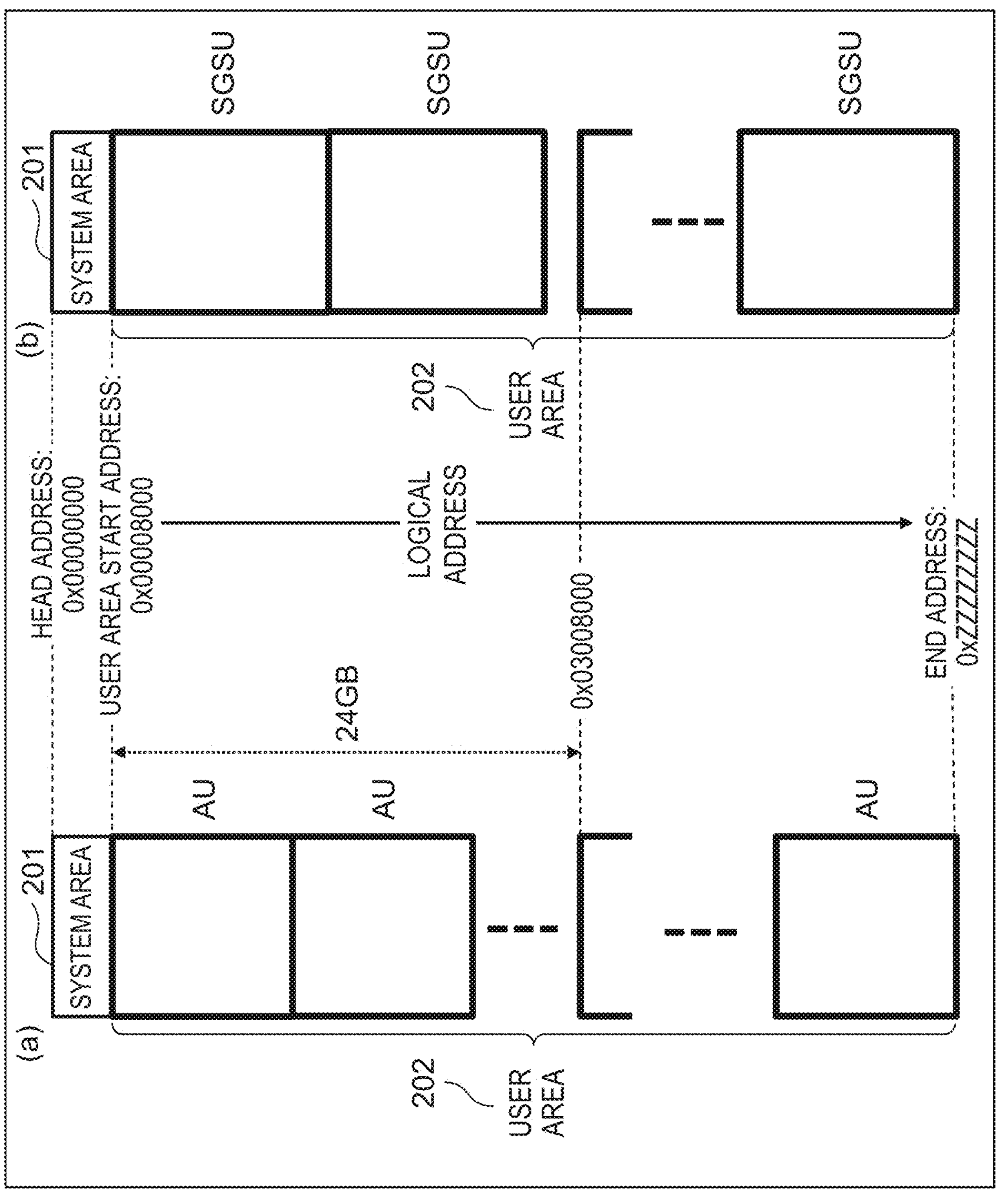
FIG. 2 is a diagram illustrating an example of a memory block of the non-volatile storage device according to the present exemplary embodiment.

Hereinafter, an exemplary embodiment will be described in detail with appropriate reference to the accompanying drawings. Note that unnecessarily detailed description is omitted in some cases. For example, detailed descriptions of already well-known matters and duplicated description of substantially identical configurations are not described in some cases. This is to avoid the explanations below from being unnecessarily redundant, and to facilitate understanding of the explanations by those skilled in the art. It is to be noted that constituent elements having the same reference mark have identical functions in the respective exemplary embodiments.

Note that the inventor provides the accompanying drawings and the following description in order for those skilled in the art to fully understand the present exemplary embodiment, and does not intend to limit the subject matter described in the claims by the accompanying drawings and the following description.

1. Configuration and Operation of Memory System According to the Present Exemplary Embodiment First, the configuration and operation of a memory system according to the present exemplary embodiment will be described with reference to FIGS. 1 to 6.

1-1. Configuration of Memory System Including Host Device and Non-Volatile Storage Device FIG. 1 is a block diagram explaining a memory system including a non-volatile storage device according to the present exemplary embodiment and a host device that controls the non-volatile storage device.

As illustrated in FIG. 1, host device 100 includes first power supply 101 that supplies at least 3.3 V power, second power supply 102 that supplies 1.8 V power, and host device controller 103.

Host device controller 103 includes at least host device interface (I/F) 105 and file system 106. Host device controller 103 is an example of a writing unit.

Furthermore, host device I/F 105 includes SD protocol controller 105*a* and NVMe protocol controller 105*b*.

Non-volatile storage device 110 includes at least flash memory 111, non-volatile storage device controller 113, and memory bus 114 that connects flash memory 111 and non-volatile storage device controller 113.

Non-volatile storage device controller 113 includes at least non-volatile storage device I/F 115.

Furthermore, non-volatile storage device I/F 115 includes SD protocol controller 115*a* and NVMe protocol controller 115*b*.

First power supply 101 included in host device 100 supplies 3.3 V power to its own host device controller 103 and flash memory 111 and non-volatile storage device controller 113 in non-volatile storage device 110 via VDD1 line 121. Furthermore, second power supply 102 supplies 1.8 V power to its own host device controller 103 and non-volatile storage device controller 113 in non-volatile storage device 110 via VDD2 line 122. In the present exemplary embodiment, two types of power supplies of 3.3 V and 1.8 V are supplied from host device 100 to non-volatile storage device 110, but only one of the power supplies or a power supply having another voltage value may be supplied in combination. In addition, from which power supply line the power is supplied to the constituent elements in host device 100 and the constituent elements in non-volatile storage device 110 is not limited to the form illustrated in FIG. 1.

A control signal and a data signal are transmitted between host device 100 and non-volatile storage device 110 via SD bus 123 or PCIe bus 124. Signal transmission on SD bus 123 is controlled by SD protocol controller 105*a* in host device I/F 105 and SD protocol controller 115*a* in non-volatile storage device I/F 115. Similarly, signal transmission on PCIe bus 124 is controlled by NVMe protocol controller 105*b* in host device I/F 105 and NVMe protocol controller 115*b* in non-volatile storage device I/F 115.

SD bus 123 and the SD protocol are collectively referred to as an SD interface, and PCIe bus 124 and the NVMe protocol are collectively referred to as a PCIe interface.

Host device 100 can write data transmitted via SD bus 123 or PCIe bus 124 in a predetermined area of flash memory 111 in non-volatile storage device 110. Furthermore, host device 100 can read data from a predetermined area of flash memory 111 in non-volatile storage device 110 via SD bus 123 or PCIe bus 124.

An example of the non-volatile storage device according to the present exemplary embodiment is an SD Express card including the SD interface and the PCIe interface. In addition, examples of the host device include a digital camera and a video camcorder compatible with an SD Express card.

1-2. Memory Block of Non-Volatile Storage Device

FIG. 2 is a diagram explaining a memory map of flash memory 111 in non-volatile storage device 110. In addition, part (a) and part (b) of FIG. 2 are diagrams explaining memory maps respectively defined by the corresponding one of the SD protocol and the NVMe protocol.

First, features of portions that do not depend on the interface in the memory map of flash memory 111 will be described.

Flash memory 111 is roughly divided into system area 201 in which management information of the non-volatile storage device is recorded and user area 202 in which content data such as a moving image and a text is recorded. Note that, unless otherwise specified in the following, a logical address on flash memory 111 is represented by an eight-digit hexadecimal number such as 0x12345678 with 512 B (bytes) as one unit, and the word "address" means a logical address.

System area 201 is disposed as an area having a predetermined size from 0x00000000 which is a head address of the entire of flash memory 111. For example, assuming that the size of system area 201 is 16 MB, an address indicating system area 201 is from 0x00000000 to 0x00008000 because one unit of the address is 512 B. Note that, in the present description, a start address and the head address have the same meaning.

User area 202 is disposed behind system area 201. In FIG. 2, because the size of system area 201 is 16 MB, the start address (user area start address) of user area 202 is 0x00008000, and addresses up to an end address 0xZZZZZZZZ determined according to the capacity of non-volatile storage device 110 are allocated. For example, the address of user area 202 at a position advanced by an amount of 24 GB from the user area start address 0x00008000 is 0x03008000 in hexadecimal notation.

Host device 100 designates a position of data reading or data writing in system area 201 and user area 202 by using the above address.

As described above, in flash memory 111 in non-volatile storage device 110, the (logical) address indicating the position of data writing or data reading is common regardless of the interface (in the present exemplary embodiment, the SD interface and the PCIe interface), and the method of use in each interface will be described below.

Part (a) of FIG. 2 is a memory map defined by the SD protocol. An allocation unit (AU) defined by the SD protocol is one of memory management units related to an erasure block unique to flash memory 111 defined on user area 202, and is a memory block (data block) suitable for a case where host device 100 writes stream data requiring real-time properties such as a moving image. As the size of the AU, a value unique to non-volatile storage device 110 is held in SD protocol controller 115*a*, and host device 100 can read the AU via SD bus 123.

Part (b) of FIG. 2 is a memory map defined by the NVMe protocol. A stream granularity size (SGS) defined by the NVMe protocol is a size of a memory management unit suitable for handling stream data defined on user area 202, and a corresponding memory block (data block) is referred to as an SGS unit (SGSU).

A unique value of the SGS is held in NVMe protocol controller 115*b*, and host device 100 can read the SGS via PCIe bus 124.

The AU in the SD protocol corresponds to the SGSU in the NVMe protocol. Non-volatile storage device 110 can independently set the size of the SGSU (SGS) and the size of the AU in the SD protocol.

1-3. Operation of Memory System Via SD Bus

First, a method in which host device 100 writes stream data such as a moving image in non-volatile storage device 110 while guaranteeing the minimum recording speed via SD bus 123 in the memory system of the present exemplary embodiment will be described.

Host device 100 supplies power of 3.3 V to each constituent element in non-volatile storage device 110 via VDD1 line. Thereafter, SD protocol controller 105*a* of host device I/F 105 transmits and receives signals to and from non-volatile storage device 110 via SD bus 123, and initializes non-volatile storage device controller 113 and flash memory 111.

In the initialization of flash memory 111, a file allocation table (hereinafter, abbreviated as FAT) indicating at least which area in flash memory 111 valid data is recorded is generated and held in system area 201. Note that, in an Extended Capacity SD memory card (SDXC card) whose capacity exceeds 32 GB or an Ultra Capacity SD memory card (SDUC card) whose capacity exceeds 2 TB among the SD cards, it is required to use exFAT as file system 106 in host device 100. In a case where non-volatile storage device 110 is such an SD card, an allocation bitmap is generated instead of FAT in initialization of flash memory 111. The above series of operations is referred to as activation of non-volatile storage device 110 by using SD bus 123.

After the activation of non-volatile storage device 110 using SD bus 123 is completed, host device 100 can read and write data from and to flash memory 111 in non-volatile storage device 110 via SD bus 123.

File system 106 instructs SD protocol controller 105*a* in host device I/F 105 to read the size of the AU held in SD protocol controller 115*a* in non-volatile storage device I/F 115.

Subsequently, file system 106 instructs SD protocol controller 105*a* to read the FAT or the allocation bitmap from system area 201 in flash memory 111. File system 106 collates the size of the read AU with the FAT or the allocation bitmap to generate an AU bitmap illustrated in FIG. 3. In the AU bitmap, "0" indicates an AU in which stream recording is disabled, and "1" indicates an AU in which the stream recording is enabled.

At the time when stream data having real-time properties such as a moving image captured by a camera is recorded in non-volatile storage device 110, a situation needs to be avoided that, as a result of time required to write data taking long, a part of data cannot be recorded.

In particular, in a case where the recording medium of non-volatile storage device 110 is flash memory 111, a problem does not occur in a case where data is continuously written in a predetermined memory block in ascending order of addresses. However, in a case where stream data is to be written in a memory block in which valid data is recorded, considering the characteristics of flash memory 111, processing is required to read the valid data once into a buffer (not illustrated) in non-volatile storage device controller 113, allocate the (logical) address to a memory block in which the entire area newly secured by being merged with the data to be newly written is constituted of invalid data, and write the merged data in the order of addresses. Further, conventionally, after data is read out to a buffer from a memory block in which valid data has been recorded, the data of the entire memory block needs to be erased and another (logical) address needs to be allocated. In this case, an overhead occurs as compared with a case where data is continuously written in the ascending order of addresses.

At the time when host device 100 writes the stream data in non-volatile storage device 110, in order to guarantee the writing of the stream data at a predetermined speed or higher at all times, a rule of selecting only the AU in which the stream recording is enabled and continuously writing the stream data is defined on the basis of the AU bitmap generated by file system 106.

In generation of the AU bitmap, if the sum of the sizes of pieces of valid data in the AU is less than or equal to a predetermined value, "1" is allocated as stream recording enabled, and otherwise, "0" is allocated as stream recording disabled.

In general, at the time when the recorded valid data in the AU is read to the buffer in non-volatile storage device controller 113, if the sum of the sizes of pieces of valid data is small, the overhead is not excessive. Therefore, the AU satisfying such a condition can be set to enable the stream recording. As an example, in a case where the size of the AU is 128 MB, if the sum of the sizes of pieces of valid data recorded in the AU is less than or equal to 16 MB corresponding to ⅛ of 128 MB, the AU can be set to enable the stream recording.

Note that, in view of convenience of the AU bitmap generation in host device 100, "0" may be assigned as stream recording disabled to the AU including the valid data even partially, and "1" may be assigned as stream recording enabled to the AU not including the valid data at all. In the following description, it is assumed that the AU bitmap is generated according to a rule of determining whether or not the stream recording is enabled or disabled depending on the presence or absence of valid data.

Figure 3:
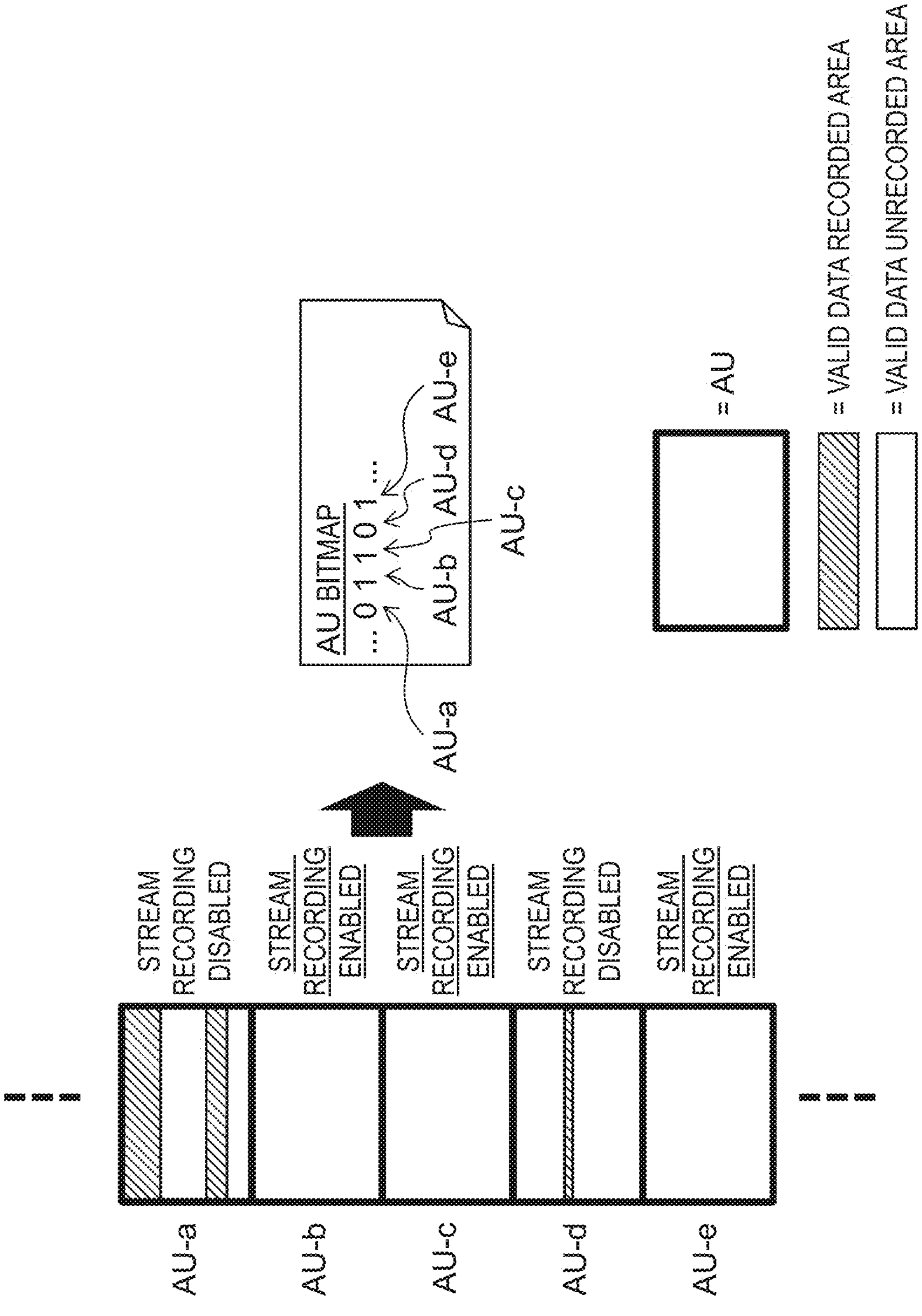
FIG. 3 is a diagram illustrating an AU bitmap according to the present exemplary embodiment.

In FIG. 3, because valid data is included in AU-a and AU-d, "0" indicating that the stream recording is disabled is set as the value of the corresponding AU bitmap, and because valid data is not included in AU-b, AU-c, and AU-e, "1" indicating that the stream recording is enabled is set as the value of the corresponding AU bitmap.

The size of the AU and which area in flash memory 111 the valid data is recorded differ depending on non-volatile storage device 110. Therefore, in particular, in a case where non-volatile storage device 110 is insertable and removable, host device 100 needs to acquire the size of the AU and generate the AU bitmap each time non-volatile storage device 110 is activated by using SD bus 123.

1-4. Operation of Memory System Via PCIe Bus

Next, a method in which host device 100 writes the stream data to non-volatile storage device 110 while guaranteeing the minimum recording speed via PCIe bus 124 in the memory system of the present exemplary embodiment will be described.

After host device 100 supplies power of 3.3 V to non-volatile storage device 110 via the VDD1 line, SD protocol controller 105*a* in host device I/F 105 confirms, via SD bus 123, whether or not non-volatile storage device 110 supports PCIe bus 124 for SD protocol controller 115*a* in non-volatile storage device I/F 115.

In a case where it is detected that non-volatile storage device 110 supports PCIe bus 124, host device 100 supplies 1.8 V power from second power supply 102 to non-volatile storage device 110 via VDD2 line 122. In addition, host device I/F 105 stops its own SD protocol controller 105*a*, activates its own NVMe protocol controller 105*b*, transmits and receives signals to and from NVMe protocol controller 115*b* in non-volatile storage device I/F 115 via PCIe bus 124, and initializes non-volatile storage device controller 113 and flash memory 111. Note that, as in the case of Section 1-3, the initialization of flash memory 111 includes at least an operation of generating the FAT or the allocation bitmap and holding the same in system area 201. The above series of operations is referred to as activation of non-volatile storage device 110 by using PCIe bus 124.

After the activation of non-volatile storage device 110 using PCIe bus 124 is completed, host device 100 can read and write data from and to flash memory 111 in non-volatile storage device 110 via PCIe bus 124.

Note that, at the time when host device 100 uses PCIe bus 124, non-volatile storage device controller 113 and flash memory 111 may be directly initialized via PCIe bus 124, that is, non-volatile storage device 110 may be activated by using PCIe bus 124 without confirming the support of PCIe bus 124 by using SD bus 123 described above.

Figure 4:
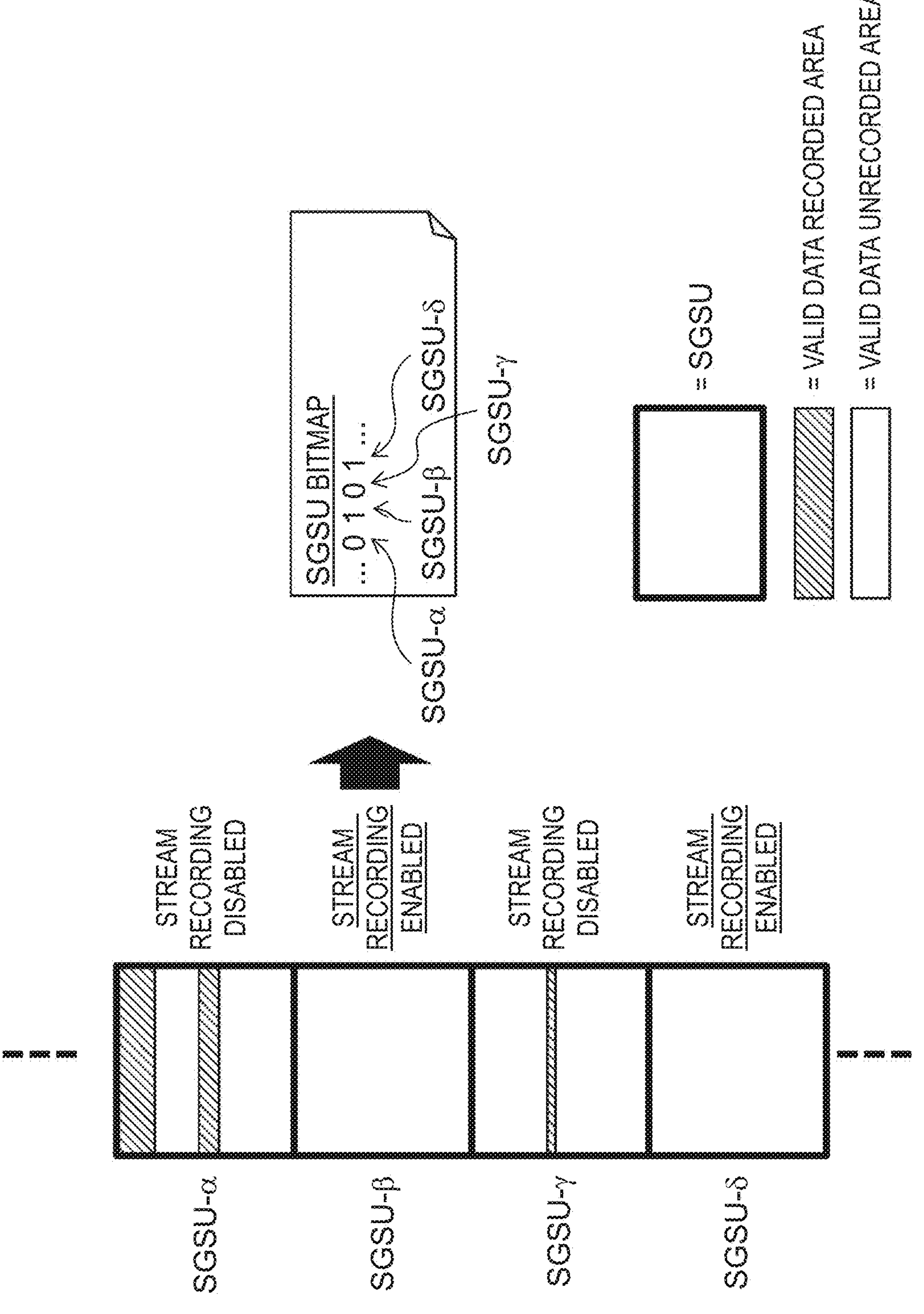
FIG. 4 is a diagram illustrating an SGSU bitmap according to the present exemplary embodiment.

File system 106 causes NVMe protocol controller 105*b* in host device I/F 105 to read the SGS held in NVMe protocol controller 115*b* in non-volatile storage device I/F 115 and the FAT or the allocation bitmap stored in system area 201 of flash memory 111, and generates an SGSU bitmap illustrated in FIG. 4.

Similarly to the AU bitmap, in the SGSU bitmap, "0" is assigned to the SGSU including valid data as stream recording disabled, and "1" is assigned to the SGSU not including valid data as stream recording enabled. In FIG. 4, because valid data is included in SGSU-α and SGSU-γ, "0" indicating that the stream recording is disabled is set as the value of the corresponding SGSU bitmap, and because valid data is not included in SGSU-β and SGSU-δ, "1" indicating that the stream recording is enabled is set as the value of the corresponding SGSU bitmap. Note that "1" may be assigned as stream recording enabled if the sum of the sizes of the valid data is less than or equal to a predetermined value, and otherwise, "0" may be assigned as stream recording disabled.

Similarly to the case of Section 1-3, SGS and which area in flash memory 111 the valid data is recorded differ depending on non-volatile storage device 110. Therefore, in particular, in a case where non-volatile storage device 110 is insertable and removable, host device 100 needs to read the SGS and generate the SGSU bitmap every time non-volatile storage device 110 is activated by using PCIe bus 124.

In addition, in order to guarantee the writing of the stream data at a predetermined speed or higher at all times, host device 100 applies a rule of selecting only the SGSU in which the stream recording is enabled on the basis of the SGSU bitmap generated by file system 106 and continuously writing the stream data.

1-5. Problems in Conventional Method

In the memory system of the present exemplary embodiment described above, a case will be considered in which host device 100 first records stream data in non-volatile storage device 110 via SD bus 123 and then records stream data in same non-volatile storage device 110 via PCIe bus 124 by a conventional method.

Figure 5:
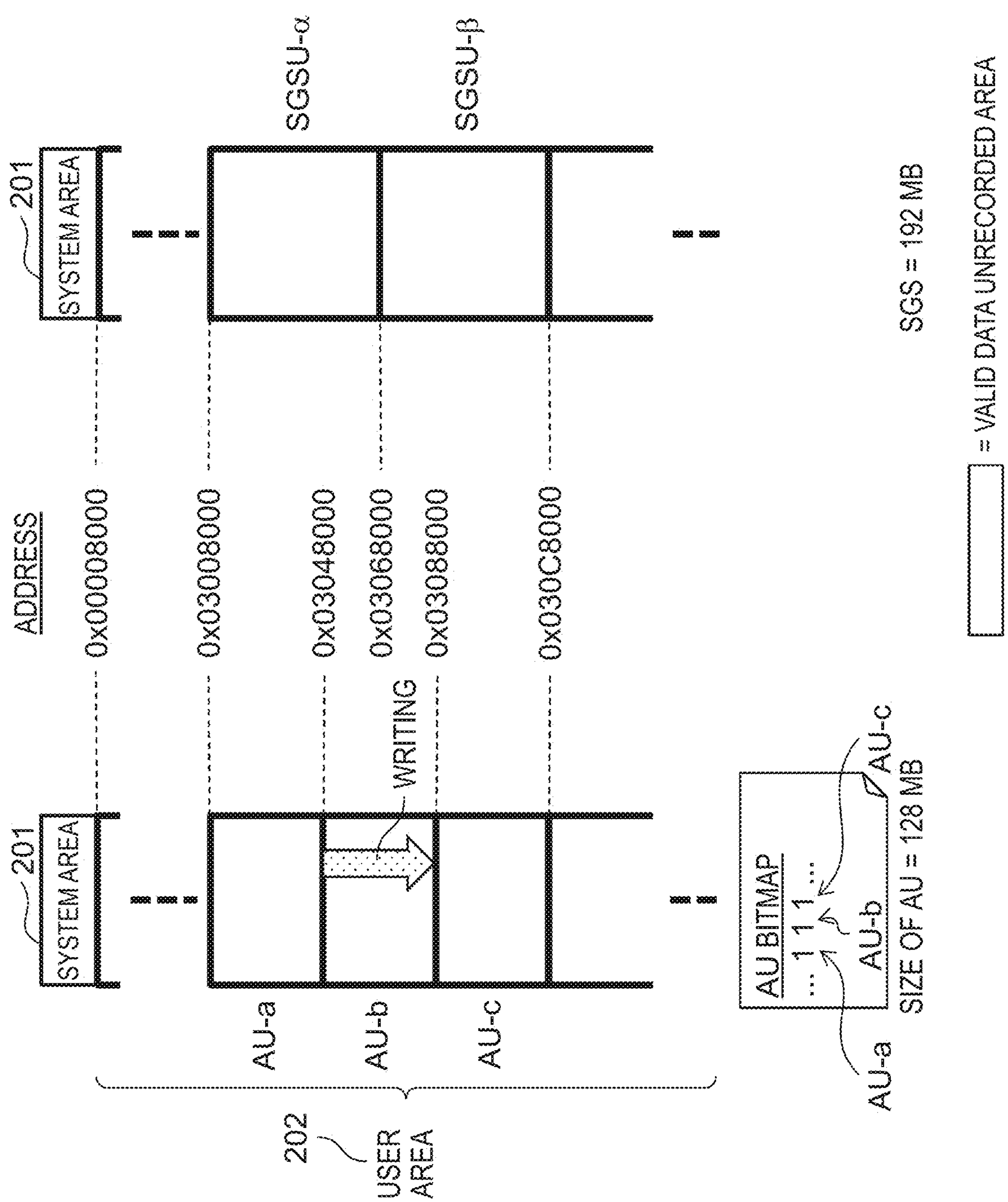
FIG. 5 is a diagram illustrating a relationship between an AU and an SGSU in a case where the AU and the SGSU are configured on the basis of a conventional technique.

FIG. 5 is a diagram showing a part of user area 202 of flash memory 111 in non-volatile storage device 110.

It is assumed that user area 202 starts from the address 0x0008000, the size of the AU is 128 MB, and the size of the SGS is 192 MB. When the AU and the SGSU are respectively allocated from the start address 0x0008000 of user area 202 without a gap, the address 0x3008000 becomes the head address of both the AU and the SGSU.

Now, the AU having the address 0x3008000 as the head address is set as AU-a, and the AUs following AU-a are sequentially set as AU-b and AU-c. At this time, the head addresses of AU-b and AU-c are respectively set as 0x3048000 and 0x3088000.

Furthermore, the SGSU having the address 0x3008000 as the head address is referred to as SGSU-α, and the SGSU following SGSU-α is referred to as SGSU-β. At this time, the head address of SGSU-β is 0x3068000.

First, in order to write stream data in non-volatile storage device 110, host device 100 executes activation of non-volatile storage device 110 by using SD bus 123 by the method described in Section 1-3. Host device 100 selects AU-b as an AU in which the stream recording is enabled from the generated AU bitmap, and writes stream data having the same size as the size of the AU from the head address 0x3048000 of AU-b to 0x3088000. After the stream data is written, host device 100 updates the FAT or the allocation bitmap stored in system area 201 according to a state of data writing to flash memory 111 as necessary.

Subsequently, in order to write stream data to same non-volatile storage device 110 via PCIe bus 124, host device 100 temporarily stops supply of power to non-volatile storage device 110, and executes activation of non-volatile storage device 110 by using PCIe bus 124 by the method described in Section 1-4. Because non-volatile storage device 110 is insertable and removable, updating of the FAT or the allocation bitmap is executed in the process of initializing flash memory 111 included in the activation operation of non-volatile storage device 110.

Figure 6:
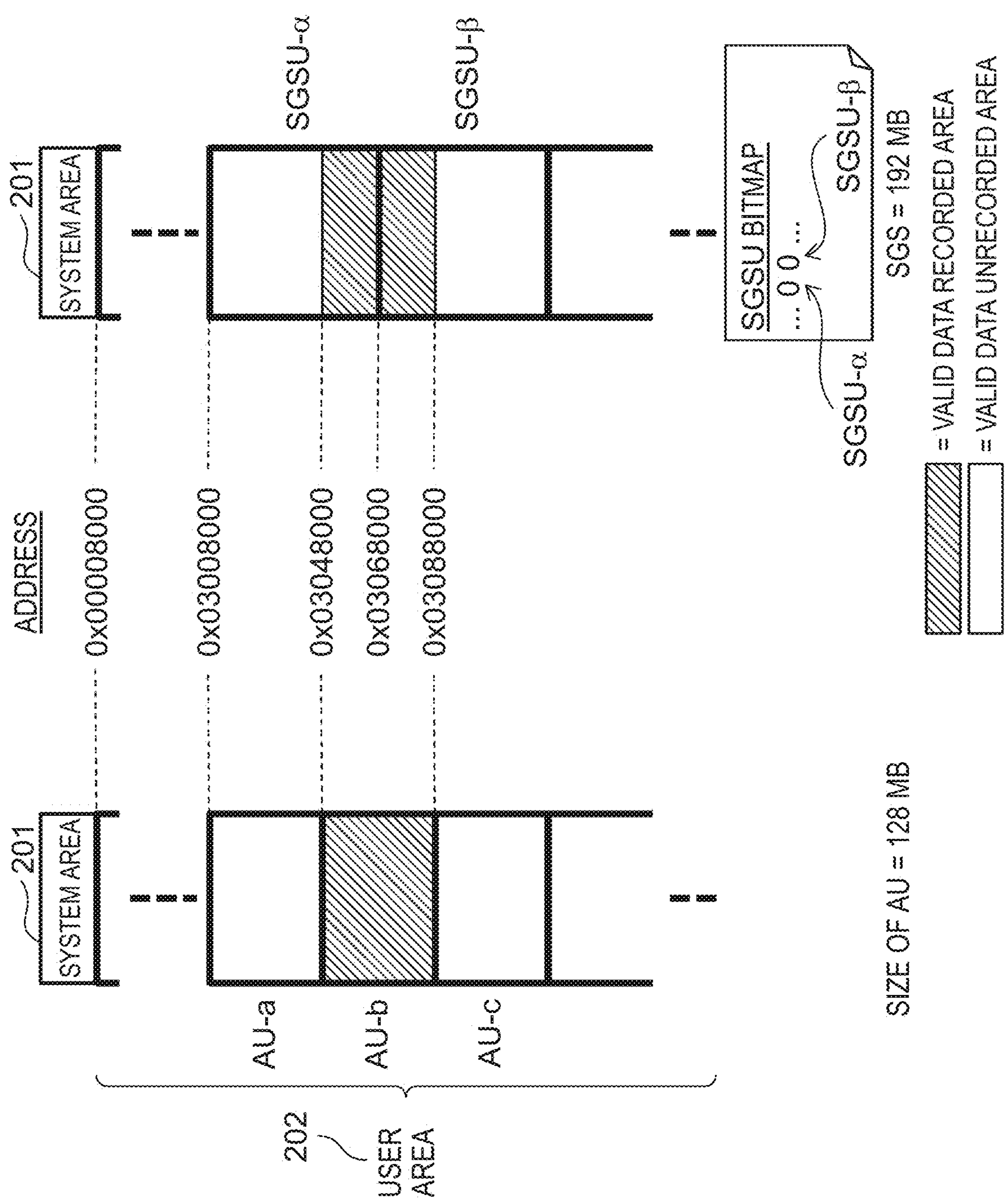
FIG. 6 is a diagram illustrating a state of a flash memory after a stream is recorded via an SD bus on the basis of a conventional technique.

At this time, as illustrated in FIG. 6, because valid data is recorded from the addresses 0x3048000 to 0x3088000, values of the SGSU bitmap corresponding to SGSU-α in which valid data exists from the addresses 0x3048000 to 0x3068000 and SGSU-β in which valid data exists from the addresses 0x3068000 to 0x3088000 are all "0". This means that the stream data cannot be written to either of SGSU-α and SGSU-β via PCIe bus 124.

When such writing occurs over the entire of user area 202, even if a large amount of valid data unrecorded area remains in flash memory 111, the number of SGSUs in which the stream recording enabled is limited, and as a result, the stream recording in flash memory 111 is disabled in a short time from the start of use of non-volatile storage device 110. Assuming that the bit rate of the stream is constant, this causes the total time of streams that can be recorded in non-volatile storage device 110 is shortened, which is not preferable for the end user.

Note that the present problem possibly occurs also in a case where host device 100 first records the stream data in non-volatile storage device 110 via PCIe bus 124 and then records the stream data via SD bus 123, or in a case where host device 100 continues to record the stream data to same non-volatile storage device while switching the interface.

The inventor has recognized the present problem in the process of developing a memory system, and has devised a solution to the problem. A concrete and detailed description of the solution is hereinafter provided.

2. Configuration and Operation of Memory System According to the Present Exemplary Embodiment Hereinafter, the present exemplary embodiment will be described with reference to FIGS. 1 and 7 to 9.

FIG. 1 is a diagram illustrating a configuration of a memory system according to the present exemplary embodiment.

Figure 7:
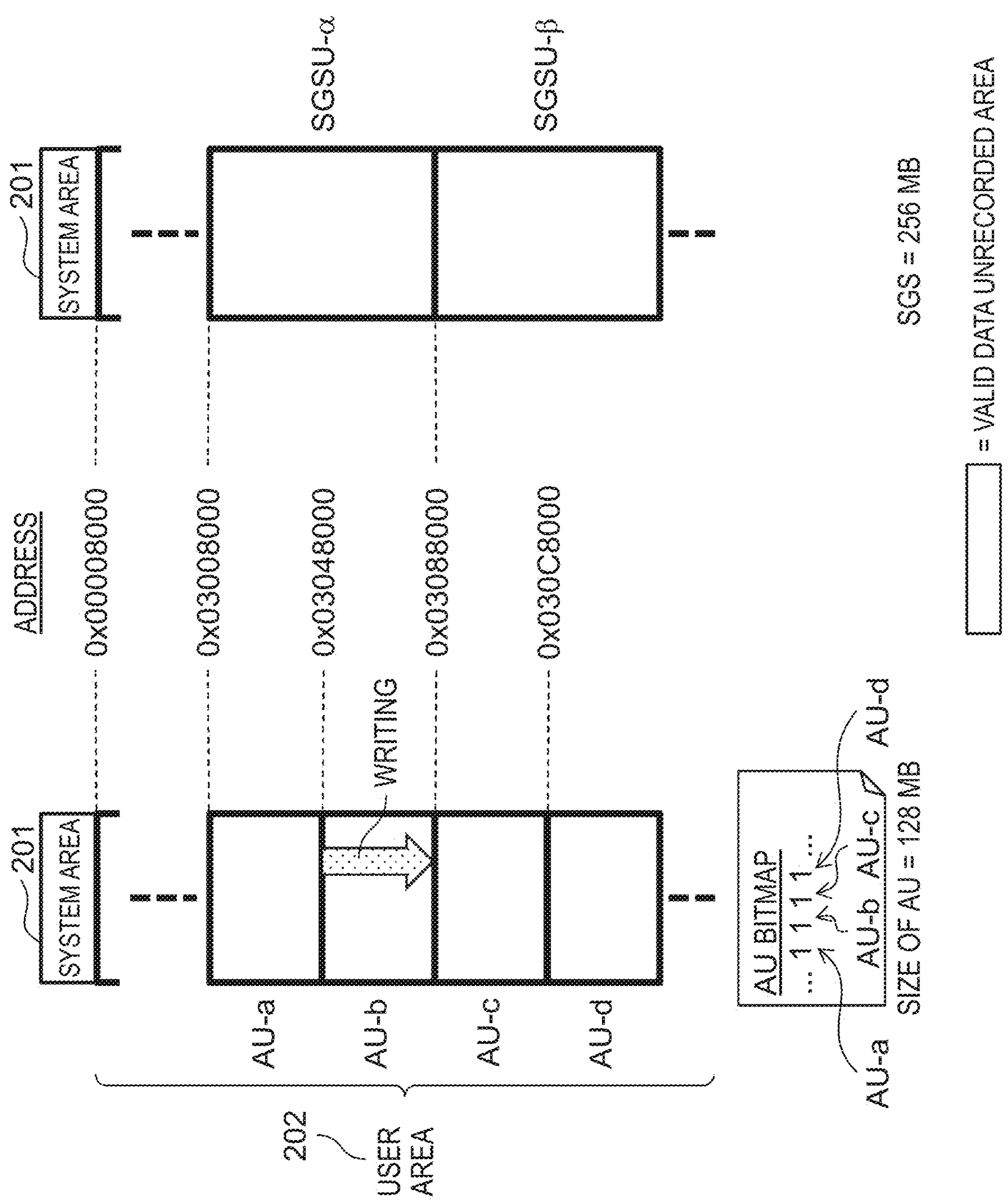
FIG. 7 is a diagram illustrating a relationship between an AU and an SGSU in a case where the AU and the SGSU are configured on the basis of the present exemplary embodiment.

FIG. 7 is a diagram illustrating a part of user area 202 of flash memory 111 in non-volatile storage device 110 according to the present exemplary embodiment.

It is assumed that user area 202 starts from the address 0x0008000, the size of the AU is 128 MB, and the size of the SGS is 256 MB. When each of the AU and the SGSU is allocated from the head address 0x0008000 of user area 202 without a gap, the address 0x3008000 becomes the head address of both the AU and the SGSU.

Now, the AU having the address 0x3008000 as the head address is set as AU-a, and the AUs following AU-a are sequentially set as AU-b, AU-c, and AU-d. At this time, the head addresses of AU-b, AU-c, and AU-d are respectively set as 0x3048000, 0x3088000, and 0x30C8000.

Furthermore, the SGSU having the address 0x3008000 as the head address is referred to as SGSU-α, and the SGSU following SGSU-α is referred to as SGSU-β. At this time, the head address of SGSU-β is 0x3088000.

First, in order to write stream data in non-volatile storage device 110 via SD bus 123, host device 100 executes activation of non-volatile storage device 110 by using SD bus 123 by the method described in Section 1-3. Host device 100 selects AU-b as an AU in which the stream recording is enabled from the generated AU bitmap, and writes stream data having the same size as the size of the AU from the start address 0x3048000 of AU-b to 0x3088000. After the stream data is written, the FAT or the allocation bitmap is updated according to a state of data writing to flash memory 111.

Figure 8:
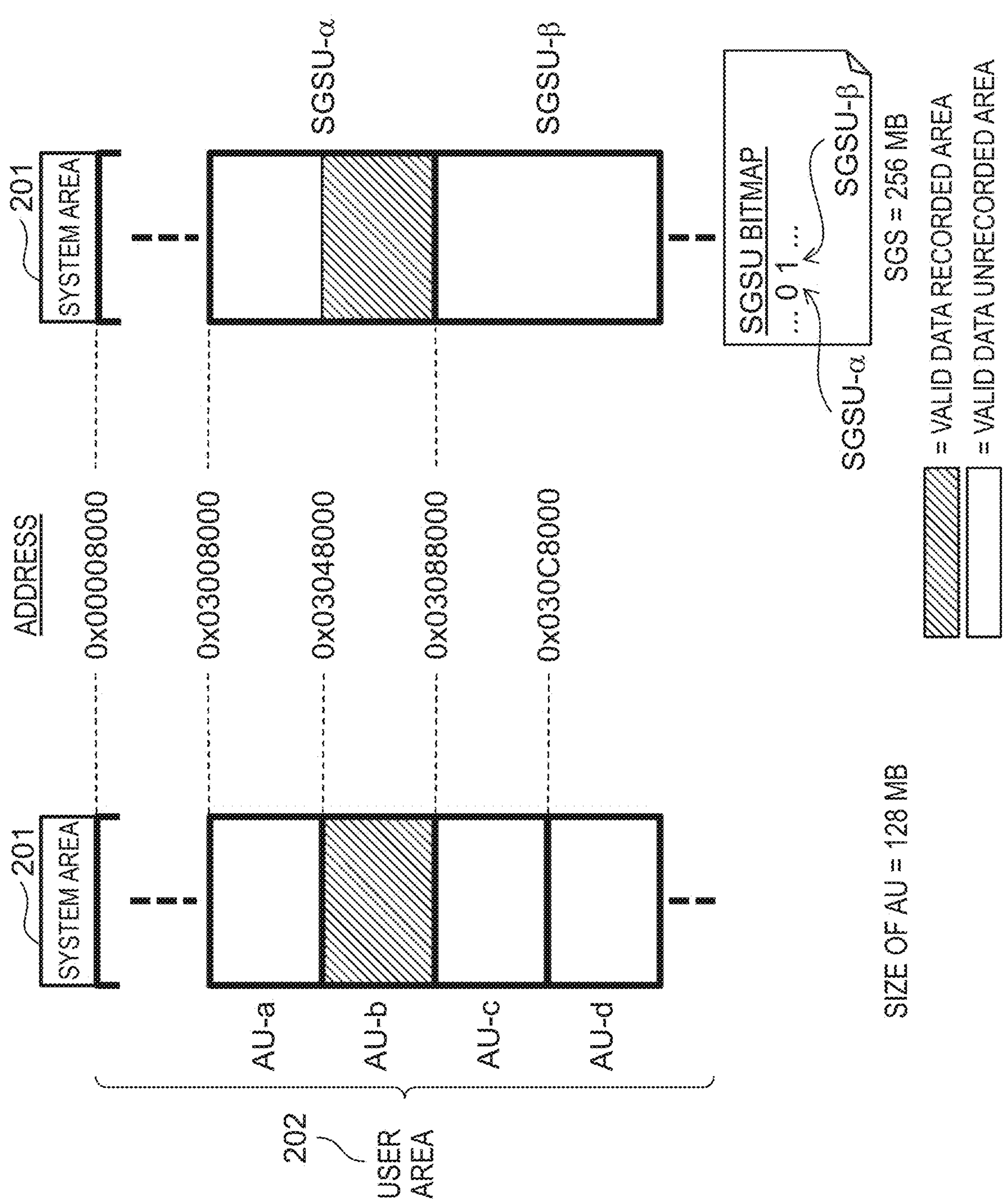
FIG. 8 is a diagram illustrating a state of a flash memory after a stream is recorded via an SD bus on the basis of the present exemplary embodiment.

Subsequently, in order to write stream data to same non-volatile storage device 110 via PCIe bus 124, host device 100 temporarily stops supply of power to non-volatile storage device 110, and executes activation of non-volatile storage device 110 by using PCIe bus 124 by the method described in Section 1-4. At this time, as illustrated in FIG. 8, because valid data is recorded from the addresses 0x3048000 to 0x3088000, the value of the SGSU bitmap corresponding to SGSU-α is "0".

On the other hand, because valid data is unrecorded in SGSU-β, the value of the corresponding SGSU bitmap is "1", which means that stream data can be written to SGSU-β via PCIe bus 124.

Note that, in the description of the present exemplary embodiment, the size of stream data to be written in the AU by host device 100 via SD bus 123 is the same as the size of the AU, but a similar effect can be obtained even in a case where the size is smaller (for example, in a case where the size of the AU is 128 MB, stream data of 100 MB is written to the AU) than the size of the AU.

FIG. 9 is a diagram illustrating a relationship between the AU and the SGSU in partial user area 901 included in user area 202.

Part (a) of FIG. 9 is a diagram illustrating a part of the state of flash memory 111 of the memory system operating on the basis of the conventional technique described in Section 1-5. At this time, the size of the AU is 128 MB, and the size of the SGS is 192 MB. Furthermore, partial user area 901 is considered, the partial user area having an amount of 1536 MB in which 12 AUs are disposed from a predetermined address X in the order of AU-a, AU-b, to AU-l, and similarly, 8 SGSUs are disposed from the address X in the order of SGSU-α, SGSU-β, to SGSU-θ.

First, it is assumed that valid data is not recorded in partial user area 901 of this amount of 1536 MB.

After host device 100 executes activation of non-volatile storage device 110 by using SD bus 123, stream data of 128 MB corresponding to the size of the AU is sequentially written from the head address of each of AU-b, AU-e, AU-h, and AU-k. As a result, an area of 128×4=512 MB is consumed.

Subsequently, host device 100 activates non-volatile storage device 110 by using PCIe bus 124, and reads the updated FAT or allocation bitmap to create the SGSU bitmap. At this time, because the state of the flash memory 111 is as illustrated in part (a) of FIG. 9, the values of all the SGSU bitmaps from SGSU-α to SGSU-θ are "0". This means that even though there is an unrecorded area of 1536−512=1024 MB in partial user area 901 out of 1536 MB, stream data cannot be written in partial user area 901 via PCIe bus 124 at all.

When such writing is performed over the entire of user area 202, the number of SGSUs of which the value of the SGSU bitmap is "1" decreases at the early stage, and the stream recording in the flash memory 111 becomes disabled in a short time.

Part (b) of FIG. 9 is a diagram illustrating a part of the state of flash memory 111 of the memory system operating on the basis of the present exemplary embodiment. At this time, the size of the AU is 128 MB, and the size of the SGS is 256 MB. Furthermore, partial user area 901 is considered, the partial user area having an amount of 1536 MB in which 12 AUs are disposed from a predetermined address X in the order of AU-a, AU-b, to AU-l, and similarly, 6 SGSUs are disposed from the address X in the order of SGSU-α, SGSU-β, to SGSU-ζ.

Similarly to the case of part (a) of FIG. 9, it is assumed that, as the initial state, valid data is unrecorded in partial user area 901 of this amount of 1536 MB. After host device 100 executes activation of non-volatile storage device 110 by using SD bus 123, stream data of 128 MB corresponding to the size of the AU is sequentially written from the head address of each of AU-b, AU-e, AU-h, and AU-k. As a result, an area of 128×4=512 MB is consumed.

Subsequently, host device 100 activates non-volatile storage device 110 by using PCIe bus 124, and reads the updated FAT or allocation bitmap to create the SGSU bitmap. At this time, because the state of flash memory 111 is as illustrated in part (b) of FIG. 9, the value of the SGSU bitmap of SGSU-α, SGSU-γ, SGSU-δ, and SGSU-ζ is "0", whereas the value of the SGSU bitmap of SGSU-β and SGSU-ε is "1" because the valid data is not recorded. This means that stream data can be written via PCIe bus 124 in an area of an amount of 256×2=512 MB corresponding to SGSU-β and SGSU-ε, and if the bit rate of the stream to be recorded is constant, a longer stream can be recorded as compared with the case of part (a) of FIG. 9.

3. Consideration

Hereinafter, a difference between the conventional technique and the present exemplary embodiment will be considered.

In non-volatile storage device 110 that can support a plurality of interfaces, in part (a) of FIG. 9 based on the conventional technique, in some cases, a boundary of the SGSU which is a larger memory block does not match a boundary of the AU which is a smaller memory block. Therefore, as illustrated in part (a) of FIG. 9, when stream data is recorded in a single AU in an enclosed state via SD bus 123, there is possibly a case where the stream data is recorded across the boundary of the SGSU, and as a result, a situation in which both of the two SGSUs before and after the boundary of the SGSU cannot record the stream data via PCIe bus 124.

On the other hand, in part (b) of FIG. 9 based on the present exemplary embodiment, the boundary of the SGSU always matches with the boundary of the AU. Therefore, when host device 100 similarly writes stream data via SD bus 123, the number of SGSUs in which the value of the SGSU bitmap is "1" increases, and as a result, the stream data can be recorded for a longer time.

On the premise that the AUs and the SGSUs are disposed without a gap from the start address of user area 202, in order to ensure that the boundary of the SGSU matches with the boundary of the AUs as illustrated in part (b) of FIG. 9, a condition is required that the size (SGS) of the SGSU which is a larger memory block is a natural number multiple of the size of the AU which is a smaller memory block.

Actually, in the case of part (a) of FIG. 9, the size of SGS/AU=192 MB/128 MB=1.5, which is not a natural number multiple. On the other hand, in the case of part (b) of FIG. 9, the size of SGS/AU=256 MB/128 MB=2, which is a natural number multiple.

With the recent technological progress of NAND memory devices, flash memory 111 having a larger capacity and a more complicated configuration has also appeared. SGS defined by the NVMe protocol has a relatively high degree of freedom in setting, and in the case of non-volatile storage device 110 having only the PCIe interface, a value of SGS suitable for flash memory 111 to be mounted can be set.

On the other hand, in the case of non-volatile storage device 110 having both the SD interface and the PCIe interface, it is needless to say that the same values are preferably set respectively to SD protocol controller **115*a* and NVMe protocol controller 115*b*** for the size of the AU and the SGS. However, setting values of the sizes of the AUs defined in the SD protocol are restricted, and it may be difficult to make both values match with each other. In such a case, the size of the memory block of one interface needs to be set to a natural number multiple or (1/natural number) times the size of the memory block of the other interface in order to realize the stream recording with high memory use efficiency.

Note that, in the present exemplary embodiment, the case where host device 100 first records the stream data in non-volatile storage device 110 via SD bus 123 and then records the stream data via PCIe bus 124 has been described. However, the present exemplary embodiment can also be applied to a case where the stream data is first recorded via PCIe bus 124 and then the stream data is recorded via SD bus 123 or a case where the stream data is continuously recorded to same non-volatile storage device 110 while the interface is switched.

The exemplary embodiment has been described above with reference to the accompanying drawings, but the present disclosure is not limited to the above examples. It is obvious that those skilled in the art can conceive various changes, modifications, substitutions, additions, deletions, and equivalents within the scope described in the claims, and it is understood that such changes, modifications, substitutions, additions, deletions, and equivalents also belong to the technical scope of the present disclosure. In addition, the components in the above-described exemplary embodiments may be optionally combined without departing from the spirit of the present invention.

The present disclosure can be applied to a non-volatile storage device such as an SD card and a microSD card having a plurality of interfaces such as an SD interface and a PCIe interface, a host device that controls the non-volatile storage device, and a memory system including the host device and the non-volatile storage device.

What is claimed is:

1. A non-volatile storage device connected to a host device via a first interface and a second interface different from the first interface, the non-volatile storage device comprising:

a controller that controls writing; and a memory, wherein the memory includes:

a first data block that is a management unit used at a time when data is written from the host device to the non-volatile storage device via the first interface; and a second data block that is a management unit used at a time when data is written to the non-volatile storage device via the second interface, and the first data block has a size that is n times or 1/n times a size of the second data block, where n is a natural number.

2. The non-volatile storage device according to claim 1, wherein the data is written from the host device with an address indicating a writing position of the data, the address being common to the first interface and the second interface.

3. The non-volatile storage device according to claim 1, wherein a head address of the first data block having a smallest head address among the first data block matches with a head address of the second data block having a smallest head address among the second data block.

4. The non-volatile storage device according to claim 1, wherein the second interface is different from the first interface in at least one of a bus and a protocol.

5. The non-volatile storage device according to claim 4, wherein the first interface is a secure digital (SD) interface, and the second interface is a peripheral component interconnect (PCI) Express interface.

6. The non-volatile storage device according to claim 5, wherein a size of the first data block corresponding to the SD interface is less than or equal to a size of the second data block corresponding to the PCI Express interface.

7. A memory system comprising a host device; and a non-volatile storage device connected to the host device via a first interface and a second interface different from the first interface, wherein the non-volatile storage device includes:

a controller that controls writing; and a memory, the memory includes:

a first data block that is a management unit used at a time when data is written from the host device to the non-volatile storage device via the first interface; and a second data block that is a management unit used at a time when data is written to the non-volatile storage device via the second interface, the host device is configured to:

at a time when data is written to the non-volatile storage device via the first interface, acquire a size of the first data block via the first interface, select the first data block including recorded valid data with a size less than or equal to a first value, and write the data; and at a time when data is written to the non-volatile storage device via the second interface, acquire a size of the second data block via the second interface, select the second data block including recorded valid data with a size less than or equal to a second value, and write the data, and the first data block has a size that is n times or 1/n times a size of the second data block, where n is a natural number.

8. The memory system according to claim 7, wherein the data is written from the host device to the non-volatile storage device with an address indicating a writing position of the data, the address being common to the first interface and the second interface.

9. The memory system according to claim 7, wherein a head address of the first data block having a smallest head address among the first data block matches with a head address of the second data block having a smallest head address among the second data block.

10. The memory system according to claim 7, wherein the second interface is different from the first interface in at least one of a bus and a protocol.

11. The memory system according to claim 10, wherein the first interface is a secure digital (SD) interface, and the second interface is a peripheral component interconnect (PCI) Express interface.

12. The memory system according to claim 11, wherein a size of the first data block corresponding to the SD interface is less than or equal to a size of the second data block corresponding to the PCI Express interface.

13. A host device connected to a non-volatile storage device via a first interface and a second interface different from the first interface, the host device comprising a writing unit that, at a time when data is written to the non-volatile storage device via the first interface, acquires a size of a first data block via the first interface, selects the first data block including recorded valid data with a size less than or equal to a first value, and writes the data, and at a time when data is written to the non-volatile storage device via the second interface, acquires a size of a second data block via the second interface, selects the second data block including recorded valid data with a size less than or equal to a second value, and writes the data, wherein the first data block is a management unit used at a time when data is written to the non-volatile storage device via the first interface, and the second data block is a management unit used at a time when data is written to the non-volatile storage device via the second interface.

14. The host device according to claim 13, wherein the second interface is different from the first interface in at least one of a bus and a protocol.

15. The host device according to claim 14, wherein the first interface is a secure digital (SD) interface, and the second interface is a peripheral component interconnect (PCI) Express interface.

* * * * *